June 7, 1966  E. S. CHARTOUNI  3,254,494
TEMPERATURE CONTROL APPARATUS
Filed Nov. 10, 1964  2 Sheets-Sheet 1
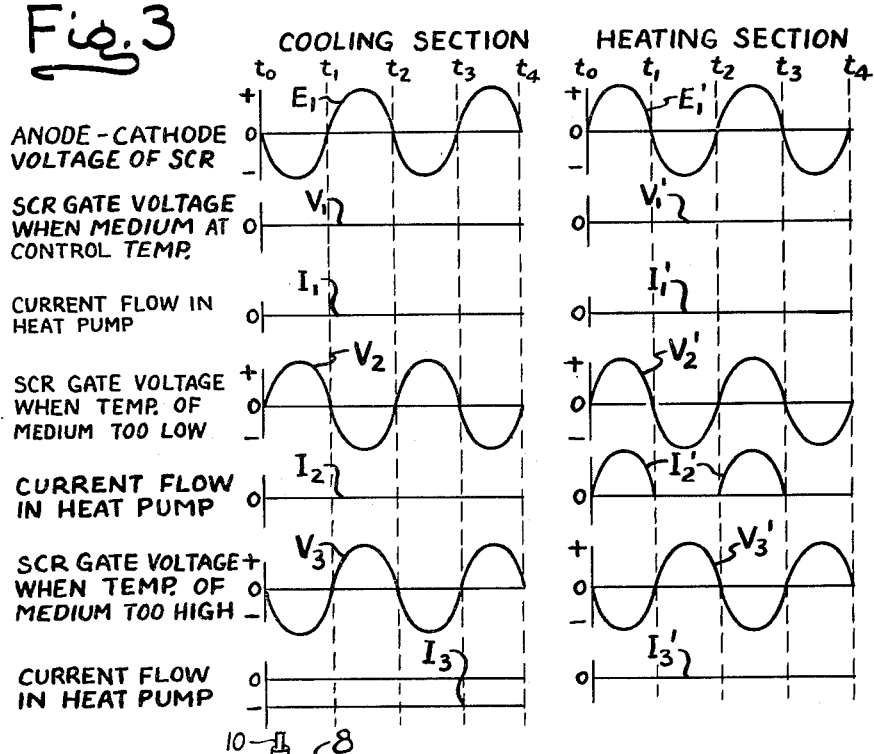
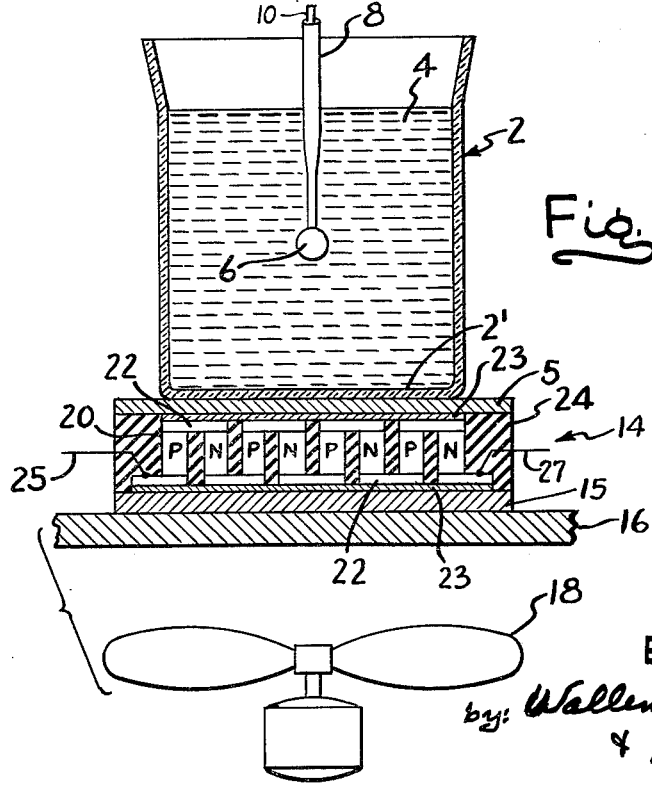
INVENTOR
ELIE S. CHARTOUNI
by: Wallenstein, Spangenberg & Hattis ATTYS.

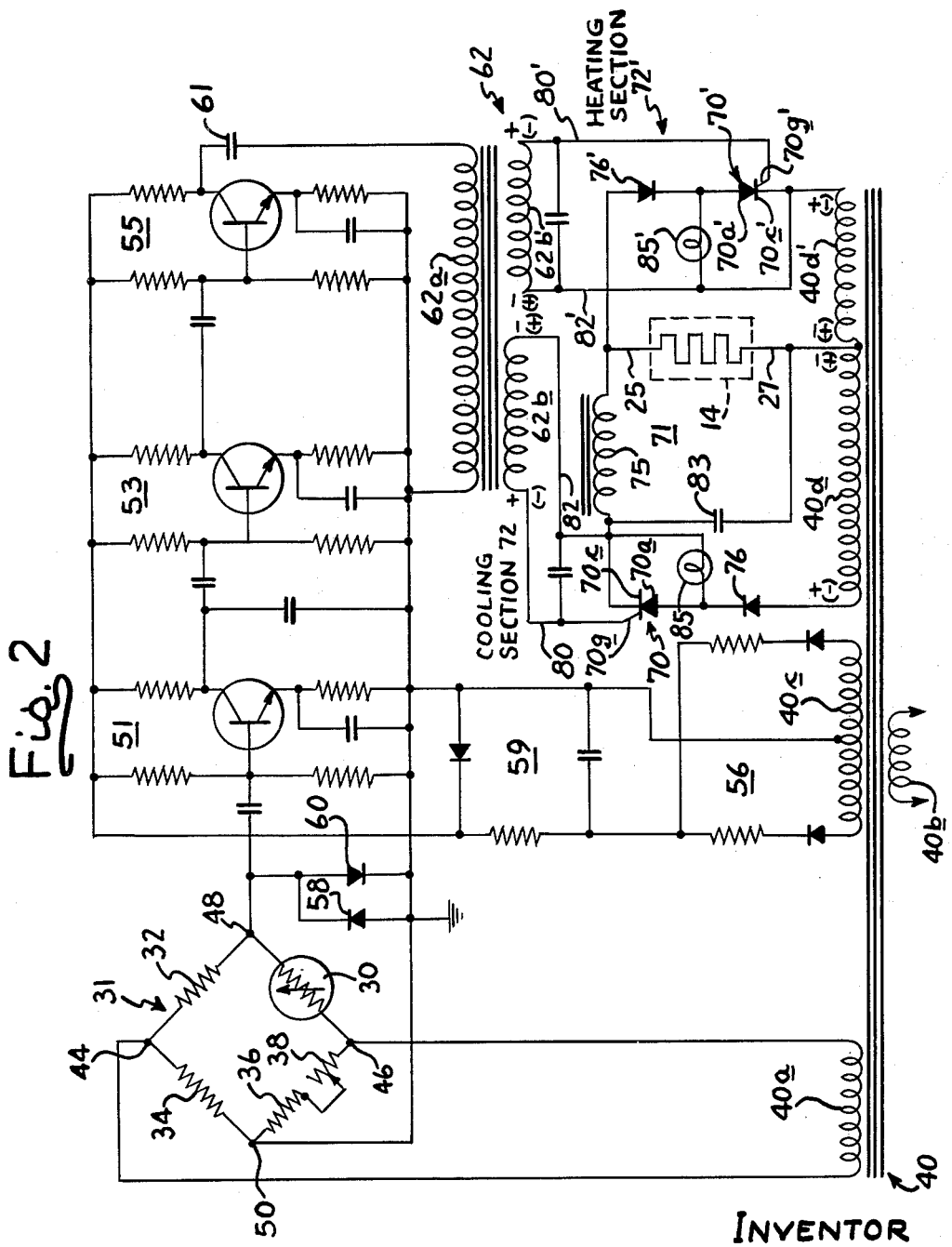

United States Patent Office 3,254,494
Patented June 7, 1966

3,254,494
TEMPERATURE CONTROL APPARATUS
Elie S. Chartouni, Chicago, Ill., assignor to E. H. Sargent & Co., Chicago, Ill., a corporation of Illinois
Filed Nov. 10, 1964, Ser. No. 410,221
5 Claims. (Cl. 62—3)

The present invention relates to temperature control apparatus which has its most important, but not its only, application in controlling the temperature of a liquid or gas in a small beaker or container.

There are many instances where it is important to keep within narrow limits the temperature of a limited supply of a liquid or a gas in a beaker or other small container. For example, in both research and routine studies of reaction kinetics and stoichiometry by high-precision recording of reaction progress with respect to time, it is often very important to keep the temperature of the medium under study within very narrow limits and under conditions where variables in the medium which affect the temperature thereof may be changing constantly.

It is an object of the present invention to provide a unique system for automatically maintaining the temperature of a given medium, such as a liquid or gas in a beaker or small container, at or very close to a control of reference temperature (which, in most cases, would be a fixed predetermined value, but which could also be a varying value), and under conditions where the variable affecting the temperature of the medium may be changing constantly.

A related object of the present invention is to provide a temperature control system as described above which is reliable in operation and which is of relatively simple and economical design.

The present invention makes use of a thermoelectric heat pump which causes heat to flow into the medium under control when current flows in one direction therethrough and withdraws heat from the medium when current flows therethrough in the opposite direction. Such a heat pump most advantageously comprises a series arrangement of P and N semiconductor elements positioned between and electrically insulated from a pair of vertically spaced plates. The upper plate may act as a base for supporting a beaker or other container containing the medium or sample whose temperature is to be controlled and the lower plate acts as a heat sink which by aid of a fan or otherwise may be maintained at the temperature of the surrounding air (i.e. at ambient temperature). When current is fed in one direction through the series connected semiconductor elements, heat is withdrawn from the upper plate and, when current is fed in the opposite direction through the series connected semiconductor elements, heat is supplied to the upper plate.

In accordance with one aspect of the present invention, a temperature responsive impedance element, such as thermistor, is sealed within a probe which is placed directly within the beaker or other container which contains the medium or sample whose temperature is to be controlled. The temperature responsive impedance element is connected into a circuit with other impedance elements, such as a Wheatstone type bridge circuit or the like, where one of the impedance elements is adjustable to vary the temperature which creates a balanced condition of the bridge circuit. In the most advantageous form of the present invention, the bridge circuit is supplied from a source of alternating current (A.C.), which may be fed thereto from the secondary winding of a power transformer having a primary winding connected to a commercial A.C. power supply. When the temperature of the medium under control is at the set temperature, the bridge circuit is balanced and the output thereof is zero; when the temperature of the medium under control is above the set temperature, the bridge circuit is unbalanced in one direction where the output thereof is an A.C. voltage of one phase which may either be in phase or 180 degrees out of phase with the input voltage to the bridge circuit; and when the temperature of the medium under control is below the set temperature the bridge circuit is unbalanced in the opposite direction and the output thereof will be an A.C. voltage 180 degrees out of phase with the output thereof under the first mentioned unbalanced condition of the bridge circuit.

The output of the bridge circuit may be fed through an amplifier circuit to the primary winding of a control transformer which produces in the secondary windings thereof a pair of voltages which are 180 degrees out of phase. The power transformer has secondary windings which provide a pair of voltages which are 180 degrees out of phase with respect to one another and preferably in phase or 180 degrees out of phase with the aforesaid voltages in the secondary windings of the control transformer.

In a manner to be described, the secondary winding voltages of the power and control transformers are utilized to control selectively the conductive conditions of control rectifiers, preferably silicon control rectifiers (SCR) devices, which control the direction of current flow through the aforementioned heat pump. When the temperature of the medium to be controlled is above the control temperature value, the connections between the various transformer secondary windings and the SCR devices are such that current will flow through the heat pump in the direction which effects removal of heat from the upper plate of the heat pump to cool the medium being controlled. On the other hand, when the temperature of the medium is below the control temperature value, the aforementioned connections are such that current will flow through the heat pump in the direction which will deliver heat to the upper plate of the heat pump to heat the medium being controlled.

The automatic control of the temperature by heating when the temperature of the medium being controlled is too low and cooling when the temperature is too high by means of the thermoelectric heat pump and phase responsive rectifier control circuit results in an exceedingly fast acting, reliable, compact and modestly priced temperature control system.

The above and other objects, advantages and features of the invention will become apparent upon making reference to the specification to follow, the claims and the drawings wherein:

FIG. 1 is a view in partial vertical section showing the aforementioned heat pump, a beaker containing a body of liquid whose temperature is to be controlled and a probe within the beaker which senses the temperature of the liquid in the beaker;

FIG. 2 is a schematic diagram of a preferred control circuit incorporating features of the invention which control the current flow through the heat pump as a result of the temperature sensed by the probe shown in FIG. 1; and FIG. 3 shows a series of waveforms illustrating voltages and currents in different portions of the circuit shown in FIG. 2.

Referring now to FIG. 1, a beaker 2 is there shown containing a body of liquid 4 whose temperature is to be controlled. The beaker is preferably one having a very unique construction in that the bottom wall 2' thereof is perfectly flat for substantially its entire extent so that it makes the best possible heat conductive relation with a flat metal plate 5 on which the beaker rests.

The temperature of the liquid 4 is sensed by a temperature responsive impedance element sealed within the head portion 6 of a probe 8. Conductors 10—10 extend from the impedance element to the outside of the probe so that the impedance element can be connected into a control circuit to be described. The temperature responsive element may be a thermistor or other temperature responsive impedance element.

The plate 5 upon which the beaker rests forms part of a heat pump unit identified by reference numeral 14. The heat pump 14 includes a bottom plate 15 resting upon a rather large, heat sink-forming wall 16 against the bottom of which is directed by a fan 18 a stream of air preferably at room temperature. The circulation of air against the bottom of the heat sink-forming wall 16 fixes the temperature of the wall 16 and the plate 15 above it approximately at room temperature. The wall 16 may form the top wall of a housing (not shown) which encloses the various elements forming the control circuit to be described.

The operating characteristics of the illustrated heat pump 14 are determined principally by a series of semiconductor elements 20 of the P and N type. These semiconductor elements, for example, may be made of bismuth telluride ($Bi_2Te_3$) with the P type elements doped with an excess of bismuth and the N type elements doped with silver iodide. These semiconductor elements 20, which are distributed over substantially the entire area occupied by the heat pump, may be connected in series circuit relation as illustrated by suitable conductive links or terminals 22 extending between the adjacent upper and low surfaces of adjacent semiconductor elements so that the current paths extend upwardly and downwardly through the various semiconductor elements. The terminals 22 are electrically insulated from the adjacent metal parts by suitable layers 23—23 of insulating cement. Spaces between the plates 5 and 15 are filled by a suitable potting compound 24. Conductors 25 and 27 extend from and connect the series connected semiconductor elements to the aforementioned control circuit.

As previously indicated when current flows in one direction through the semiconductor elements 20, heat is delivered to the upper plate 5 to heat the beaker 2, and when current flows in the opposite direction through the semiconductor elements 20 heat is withdrawn from the upper plate 5 to cool the beaker.

Refer now to FIG. 2 which shows a preferred form of control circuit for controlling the flow of current through the heat pump 14 to maintain the liquid in the beaker at a given control temperature. The temperature responsive impedance element illustrated therein is a thermistor 30 which is a device having a negative temperature coefficient. As illustrated, the thermistor 30 is connected into a Wheatstone type bridge circuit 31 where the thermistor 30 forms one of the arms of the bridge circuit, resistors 32 and 34 form two other arms of the bridge circuit and a fixed resistor 36 connected in series with a variable resistance element 38 forms the fourth arm of the bridge circuit. The variable resistance element 38 would normally be a manually variable element where the control temperature for a given situation is to be set at one of a number of possible values. However, it could be an automatically controlled element which varies the control temperature in accordance with any desired temperature control program.

In the most advantageous form of the present invention, the input of tthe bridge circuit is energized from a source of alternating current (A.C.) which is most desirably fed thereto from the secondary winding 40a of a power transformer 40. The power transformer 40 has a primary winding 40b which may be connected to a 60 cycle per second commercial power supply. The Wheatstone bridge circuit 31 has input terminals 44 and 46 located at a pair of diagonally opposite points of the bridge circuit and output terminals 48 and 50 located at the other pair of diagonally opposite terminals of the bridge circuit.

The temperature of the liquid in the beaker 2 is determined by the adjustment of the variable resistance element 38 which determines the temperature at which the bridge will be in balance where there will be no output voltage across the output terminals 48 and 50. When the temperature of the liquid in the beaker is above the selected value, the thermistor resistance will have a value which unbalances the bridge circuit in one direction where voltage across the output terminals 48 and 50 will have a sinusoidal waveform of a first phase which will be either in phase or 180 degrees out of phase with the voltage input to the bridge circuit. When the temperature of the liquid in the beaker is below the selected value, the bridge will be unbalanced in the opposite direction where the voltage across the output terminals 48 and 50 of the bridge circuit will be of opposite phase to the output voltage under the first mentioned unbalanced condition. This phase changing characteristic of the A.C. bridge circuit is taken advantage of in the preferred form of the present circuit by controlling the direction of flow of current through the heat pump in accordance with the phase of the output voltage of the bridge circuit.

In the particular preferred circuit shown in FIG. 2, the output of the bridge circuit is fed to a series of NPN transistor amplifier stages respectively identified by reference numerals 51, 53 and 55. The amplifier stages 51, 53 and 55 obtain operating D.C. voltage from a conventional full wave rectifier circuit 56 and filter circuit 59 energized from a secondary winding 40c of the power transformer 40.

The circuitry of the amplifiers stages forms no part of the present invention. Any one of a number of well known amplifier circuits could be used and so a detailed description thereof will not be given. However, it should be noted that, in the preferred circuit illustrated, a pair of reverse, parallel connected clipper rectifiers 58 and 60 are connected across the input of the first amplifier stage 51. If these rectifiers are silicon rectifiers, they will become conductive in the range of from about .5 to .7 volt and thus prevent overdriving of the amplifier transistors and the circuit coupled thereto.

The output of the last output transistor stage 55 is coupled through a suitable coupling capacitor 61 to one end of the primary winding 62a of a control transformer 62. The opposite end of the winding 62a is connected to ground (as is output terminal 50 of the bridge circuit 31 and the amplifier stages 51, 53 and 55). The amplifier stages 51, 53 and 55 are preferably designed to provide negligible phase shift so that the voltages appearing across the windings of the control transformer 62 are either in phase or 180 degrees out of phase with output of the bridge circuit 31.

The control transformer 62 has a pair of secondary windings 62b and 62b' which control the firing of a pair of SCR devices 70 and 70' forming part of a rectifier control circuit 71.

The rectifier control circuit 71 has a cooling section 72 and a heating section 72'. The heat pump 14 is connected in common between these two sections which form respective loop current paths through which current can respectively flow only in different directions through the heat pump. Thus, the heating section 72' includes a branch connected across the heat pump which branch includes in series circuit relation a voltage-dropping rectifier 76' connected to the upper end of the heat pump and arranged to pass conventional current flow in the downward direction as viewed in FIG. 2, the anode and cathode terminals 70a' and 70c' of the SCR device 70' which passes current in the same direction as the rectifier 76', and a section 40d' of the secondary of the power transformer 40 connected to the bottom end of the heat pump 14. Thus, when rectifier 76' and SCR device 70' are conductive, current will flow through the heat pump 14 in an upward direction as viewed in FIG. 2 which is the direction which will effect heating of the liquid in the beaker 2.

When the right end of the secondary section 40d' of the power transformer 40 conected to the cathode electrode 70' of the SCR device 70' is negative with respect to the other end thereof, the SCR device 70' will be prepared for firing when a positive voltage is fed to the gate or control electrode 70g' thereof. As will appear, the voltage on the gate electrode 70g' of the SCR device 70' will be positive while the device is prepared for firing only when heating is called for. If the voltage fed to the gate electrode 70g' is negative at the instant that the device is prepared for conduction, the device will not fire. The SCR devices 70 and 70' act like conventional thyratron tubes which, after firing, continues to conduct until the current flow is interrupted or drops to a point near zero.

The control circuit for the SCR device 70' includes a conductor 80' connecting one end of the secondary winding 62b' of the control transformer 62 to the gate electrode 70g' and a conductor 82' connecting the other end of the secondary winding 62b' to the cathode electrode 70c' of the SCR device 70'.

The cooling section 72 of the rectifier control circuit 71 includes a filter choke 75 connected to the upper end of the heat pump 14, the cathode and anode electrodes 70c and 70a of the SCR device 70 arranged to pass current in the upward direction as viewed in FIG. 2, a voltage dropping rectifier 76 arranged to pass current in the same direction as the SCR device 70, and a section 40d of the secondary of the power transformer 40 connected to the bottom end of the heat pump 14. Thus, the conduction of the rectifiers 70 and 76 will result in the flow of current through the heat pump 14 in a downward direction as viewed in FIG. 2, which is the direction which will effect cooling of the liquid in the beaker 2.

The secondary winding sections 40d and 40d' are arranged so that, at any given instant, the voltage at the outer ends of these sections (i.e. the points remote from the heat pump 14) have the same polarity relative to the inner ends thereof connected to the heat pump 14. It should also be noted that the cooling and heating sections of the rectifier control circuit 71 are connected in an opposite relationship to the outer ends of the transformer secondary winding sections 40d and 40d' so that, when the rectifiers of the cooling section 72 are prepared for conduction (due to the connection of the positive side of the secondary winding section 40d to the anode side of the rectifiers), the rectifiers in the heating section will not be prepared for conduction (due to the connection of the then positive side of the secondary winding sections 40d' to the cathode electrode side thereof) and vice versa. Thus, the rectifiers in the cooling and heating sections are prepared for conduction during different alternate half cycles.

The voltage appearing across the secondary winding 62b of the control transformer 62 controls the conduction of the SCR device 70 when the same is prepared for conduction. To this end, a conductor 80 extends from the left end of the secondary winding 62b to the gate electrode 70g of the SCR device 70, and a conductor 82 connects the other end of the secondary winding 62b to the cathode electrode 70c of the SCR device 70. The conductors 80 and 80' which respectively connect the windings 62b and 62b' to the gate electrodes 70g and 70g' of the SCR devices 70 and 70' are always in phase with one another as indicated by the waveforms V2 and V2' and V3 and V3' in FIG. 3.

When the temperature of the liquid in the beaker 2 is at the selected value, the output of the bridge circuit 31 will be zero as will the voltage appearing across the secondary windings 62b and 62b' of the control transformer 62, as is illustrated by waveforms V1 and V1' in FIG. 1. In such case, there will be no current flow in the SCR devices 70 and 70' or the heat pump 14. When the temperature of the liquid in the beaker 2 is below the selected value, the resulting unbalanced condition of the bridge circuit will produce in phase voltage V2 and V2' in FIG. 3 in the secondary windings 62b and 62b' of the control transformer 62 whose amplitude is proportional to the degree of unbalance of the bridge circuit. These voltages are applied to the gate electrodes 70g and 70g' of the SCR devices 70 and 70'.

The voltage waveforms E1 and E1' in FIG. 3 represent respectively the voltages applied across the cathode and anode electrodes of the SCR devices 70 and 70'. The SCR devices are prepared for conduction only during the positive going portions of the anode-cathode voltage waveforms E1 and E1'. It will be noted that the positive going portions of the anode-cathode voltage waveform E1' and the gate voltage waveform V2' applied to the SCR device 70' occur simultaneously during the first and third half cycles, that is between the intervals t0 and t1, and t2 and t3, thereby causing firing of the SCR device 70 during these intervals to produce positive pulses of current (i.e. upward flow of current) through the heat pump 14, as indicated by current waveform I2', in FIG. 3. The actual point in each such half cycle interval during which firing of the SCR device 70' takes place will vary between the 0 and 90 degree points therein. The greater the amplitude of the gate voltage, the closer to zero degrees in the half cycle involved will be the firing time and the larger will be the conduction time, of the SCR device. This characteristic of the circuit minimizes hunting or overshooting in the temperature control operation, resulting in a finer temperature control.

When the anode-cathode voltage waveform V2 applied to the SCR device 70 in the cooling section is positive, the voltage applied to the gate electrode 70g thereof is negative and vice versa, so that the SCR device 70 cannot fire when heating is called for.

When cooling is called for, the phase of the voltage in the secondary windings 62b and 62b' of the control transformer 62 will reverse so that the gate voltage applied to the gate electrodes 70g and 70g' of the SCR devices 70 and 70' will follow the waveforms V3 and V3' in FIG. 3. In such case, it will be noted that, during the second and fourth half cycles, that is between the intervals between t1 and t2, and t3 and t4, the anode-cathode voltages and the gate voltages applied to the SCR device 70 will be positive going, thereby causing the firing of the SCR device 70 at a point determined by the amplitude of the gate voltage V3, and the flow of negative current (i.e. downward flow of current) through the heat pump 14 as indicated by waveform I3 in FIG. 3. Note that the waveform I3 is not a pulsing current as in the case of the current flow I3' in the heating section of the rectifier circuit, but rather is a substantially steady current. This steady current condition is obtained by the choke 75 and a filter capacitor 83 connected between the left end of the choke 75 as viewed in FIG. 2 and the bottom of the heat pump 14.

The reasons why current pulsations are minimized in the cooling section is that it has been discovered that the pulsation of current flowing in the cooling direction through the heat pump 14 results in a decrease in the cooling effect produced by the heat pump relative to the case where a steady direct current flows therethrough. On the other hand, when a pulsating current is fed through the heat pump 14 in the heating direction, the pulsating nature of the current produces an increased heating effect, hence the absence of a filter in the heating section 72' of the control rectifier circuit.

It is often desirable to know whether the heat pump is in a heating or cooling mode of operation. To this end, a heating mode indicating lamp, which may be a red colored lamp, is connected between the anode and cathode electrodes of the SCR device 70 in the cooling section of the control rectifier circuit. When the SCR device 70 is conducting, the anode to cathode voltage of the SCR device is low so that there is relatively little current flow through the lamp 85 which will then appear dark. On the other hand, when the SCR device 70 is in a non-conductive condition, indicating that the heating section rather than the cooling section is operating, the voltage across the anode to cathode electrodes of the SCR device 70 will be sufficiently high to effect energization of the lamp 85.

A cooling mode indicating a lamp 85', which may be a blue lamp, is connected between the anode and cathode electrodes of the SCR device 70' in the heating section of the rectifier circuit so that the lamp will be energized only when the cooling section 72 is operating.

It will now be appreciated that the present invention provides a fast acting, simple and reliable system for controlling the temperature of a given medium.

It should be understood that numerous modifications may be made in the most preferred form of the invention described above without deviating from the broader aspects of the invention.

I claim:

1. In combination, a reversible solid state thermoelectric heat pump to remove heat from a given medium when current flows therethrough in one direction and to supply heat to the medium during the opposite direction of current flow therethrough, temperature responsive circuit means for providing a signal of one phase when the temperature of said medium is above a given reference temperature and for providing a signal of opposite phase to said one phase when the temperature of said medium is below said reference temperature, control circuit means responsive to said signal of one phase for directing a substantially steady current in one direction through said heat pump to effect removal of heat from said medium and responsive to said signal of opposite phase for directing a pulsing current in said opposite direction therethrough to add heat to said medium.

2. In combination, a reversible solid state thermoelectric heat pump which removes heat from a given medium when current flows therethrough in one direction and supplies heat to the medium when current flows therethrough in the opposite direction, a source of current, a temperature responsive impedance element to be inserted into said medium, additional impedance elements, one being an externally variable element for setting a control temperature value, connected to said temperature responsive impedance element to form a bridge type circuit having an input coupled to said source of current and an output which produces a first output when the temperature of said medium is above said control temperature value and a second output when the temperature of said medium is below said control temperature value, a control circuit for controlling the direction of current flow through said heat pump in response to the output of the bridge circuit comprising a first unidirectional current control device having a control terminal and a pair of load terminals connected in a first circuit including said heat pump wherein said first current control device is rendered conductive to effect current flow in said one direction in said heat pump when a first control signal is fed to the control terminal thereof, a second unidirectional current control device having a control terminal and a pair of load terminals connected in a second circuit including said heat pump wherein said second current control device is rendered conductive to effect current flow in said opposite direction through the heat pump when a second control signal is fed to the control terminal thereof, means responsive to said first output of said bridge circuit by coupling said first control signal to the control terminal of the current control device which feeds current through said heat pump in said one direction and responsive to said second output of said bridge circuit by coupling said second control signal to the control terminal of the current control device which feeds current through said heat pump in said opposite direction, and indicating means for indicating a cooling mode of operation when current flows in said one direction through said heat pump and for indicating a heating mode of operation when current flows in said opposite direction through said heat pump.

3. In combination, a reversible solid state thermoelectric heat pump which removes heat from a given medium when current flows therethrough in one direction and supplies heat to the medium when current flows therethrough in the opposite direction, a source of alternating current, a temperature responsive impedance element to be inserted into said medium, additional impedance elements, one being an externally variable element for setting a control temperature value, connected to said temperature responsive impedance element to form a bridge type circuit having an input coupled to said source of alternating current and an output which produces a first alternating current output of one phase when the temperature of said medium is above said control temperature value and a second alternating current output 180 degrees out of phase with said first output when the temperature of said medium is below said control temperature value, a control circuit for controlling the direction of current flow through said heat pump comprising a power transformer having primary winding means coupled to said source of alternating current and secondary winding means having first and second sections in which voltages 180 degrees out of phase are respectively induced, a first unidirectional current control device having a control terminal and a pair of load terminals connected in a first circuit, including one of said transformer secondary sections and said heat pump wherein said first current control device is rendered conductive during alternate half cycles to effect current flow in said one direction in said heat pump when a control signal of a given magnitude and polarity is fed to the control terminal thereof, a second unidirectional current control device having a control terminal and a pair of load terminals connected in a second circuit including the other transformer secondary section and said heat pump and wherein said second current control device is rendered conductive between said alternate half cycles to effect current flow in said opposite direction through the heat pump when a control signal of a given magnitude and polarity is fed to the control terminal thereof, and means for coupling the output of said bridge circuit to the control terminals of said first and second current control devices to effect conduction of the current control device which feeds current through said heat pump in said one direction during alternate half cycles, when the output of the bridge circuit indicates that the temperature of said medium is below said control temperature value and to effect conduction of the current control device which feeds current through said heat pump in said opposite direction during the intervening half cycles when the output of the bridge circuit indicates that the temperature of said medium is above said control temperature value.

4. The combination of claim 3 wherein there is provided in only the circuit containing said current control device which effects current flow in said opposite cooling direction through said heat pump a filter which smooths out the current pulsations therein.

5. The combination of claim 3 wherein said means for coupling the bridge type circuit to the control terminals of said current control devices includes a transformer having a primary winding and a pair of secondary windings respectively connected to the control terminals of said current control devices, and means for coupling both of the oppositely phased outputs of the bridge type circuit across said primary winding.

References Cited by the Examiner

UNITED STATES PATENTS

| 2,986,009 | 5/1961 | Gaysowski | 62—3 |
| 3,107,324 | 10/1963 | Wright | 62—3 |
| 3,111,008 | 11/1963 | Nelson | 62—3 |
| 3,121,998 | 2/1964 | Nogata | 62—3 |
| 3,152,451 | 10/1964 | Downs | 62—3 |

WILLIAM J. WYE, *Primary Examiner.*